C. KEWIN.
Improvement in Gang-Plows.

No. 132,910. Patented Nov. 12, 1872.

Witnesses
J. L. Borne
C. M. Richardson

Inventor
Charles Kewin
per Dewey & Co
his Attys

UNITED STATES PATENT OFFICE.

CHARLES KEWIN, OF SAN FRANCISCO, CALIFORNIA.

IMPROVEMENT IN GANG-PLOWS.

Specification forming part of Letters Patent No. 132,910, dated November 12, 1872.

*To all whom it may concern:*

Be it known that I, CHARLES KEWIN, of San Francisco city and county, State of California, have invented an Improved Gang-Plow; and I do hereby declare the following description and accompanying drawing are sufficient to enable any person skilled in the art or science to which it most nearly appertains to make and use my said invention or improvement without further invention or experiment.

My invention relates to a novel mechanism for raising and lowering the plows of a gang in order to throw them into or out of the ground without requiring the utmost power of the driver, as is necessary in most other gang-plows. My improvement consists in the employment of a compound lever for raising and lowering the plows and frame, which is so arranged that the power will be applied at two different parts of the plow-frame.

In order to more fully illustrate and explain my invention, reference is had to the accompanying drawing forming a part of this specification, in which—

Figure 1:
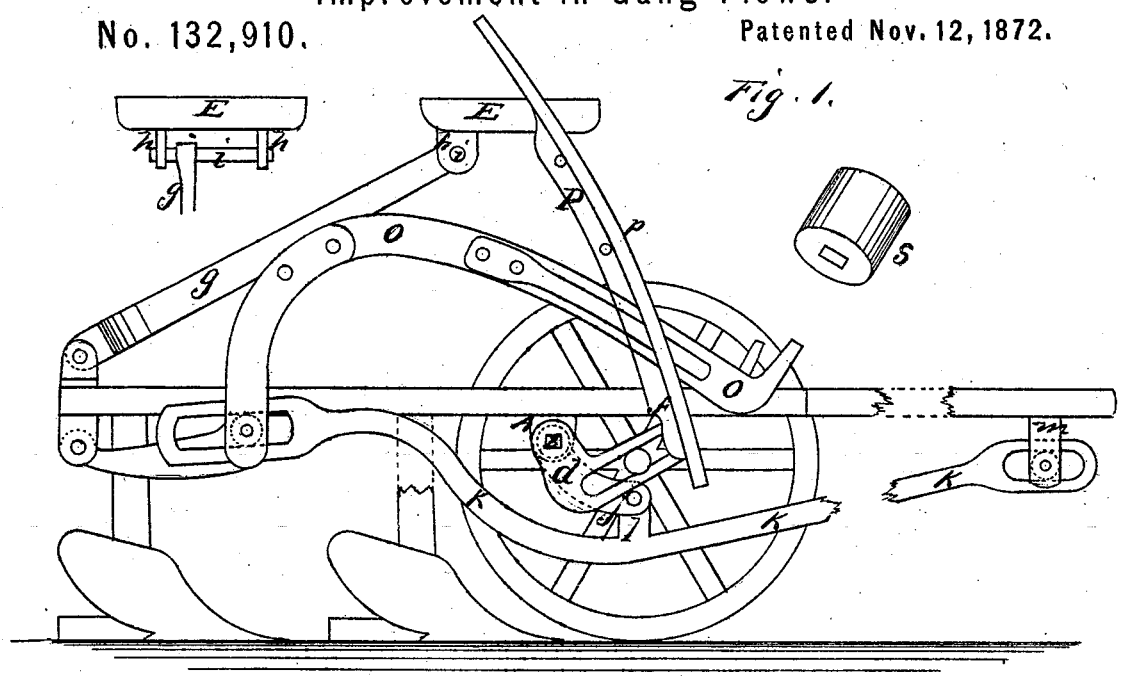
Figure 2:
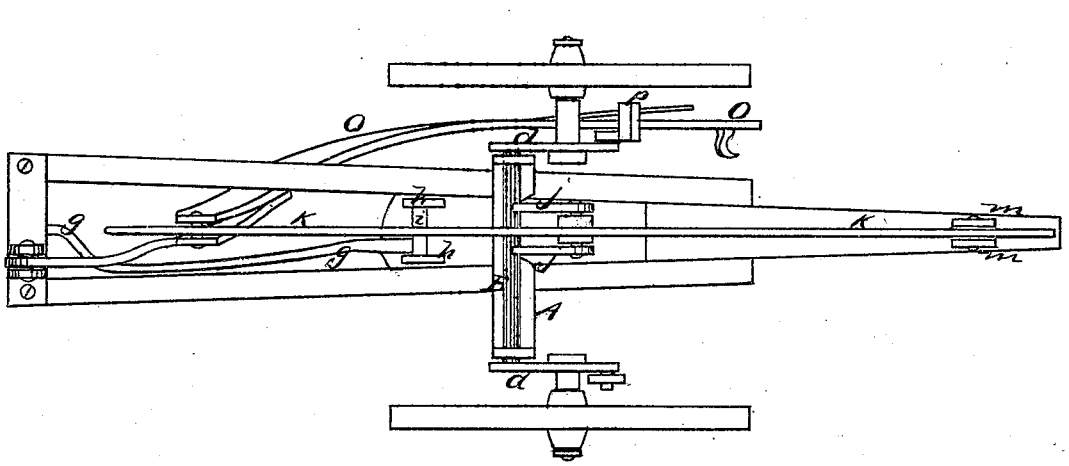

Figure 1 is a side elevation of my plow. Fig. 2 is a bottom view.

A represents a cross bar or plate, upon which the plow-frame rests. The ends of this plate are turned down, as shown, and the axle B is supported by passing through holes in the turned-down ends. A crank-shaped plate, $d$, is secured to each end of this axle. These plates are slotted, as shown, and the journals upon which the wheels revolve are secured in the slots by suitable means. The seat E is supported by standards $f$ from the extremity of the long arm of the crank, and a link or rod, $g$, which is hinged to the rear end of the frame, extends up to the rear end of the seat, where it is supported in lugs $h$ by the cross arms or journals $i$, thus forming a brace for the seat to keep it in place. Extending downward and forward from the middle of the axle B are two rigid arms, $j\,j$. K is an iron bar or rod, which has near its middle an upward-projecting arm, $l$, the upper end of which is held by a pin between the ends of the rigid arms $j\,j$. One end of this bar extends forward under the pole and its extremity is slotted, as shown. Two parallel plates, $m$, extend down from the pole, between which the end of the bar is supported by a pin which passes through the slot, and upon which a friction-roller is placed. The opposite end of this bar extends back to near the rear end of the plow-frame, and its extremity is also provided with a slot similar to that on the forward end. The operating-lever O has one end hinged to the rear end of the plow-frame, and extends forward a short distance, when it bends upward and then forward again between the rack P and guard $p$. The rear end of the bar K is secured to this lever at or near the first bend by a pin and friction-roller, as above described, for the forward end, an additional plate being secured to the lever to form a support for the outer end of the pin.

Now, this being the construction, we find that by lifting the lever O to the upper end of the rack, the rear end of the bar K is lifted also, while the forward end does not change its level. This movement causes the arm $l$ of the bar K to lift or pry upward on the arms $j\,j$, which turns the axle about the cranks and lowers the frame and plows. By depressing the lever O to the lower end of the rack the rear end of the bar K is also depressed, thus turning the axle so as to lower the wheels and raise the plows and frame. The distance from the arm $l$ to the forward end of the bar K being greater than to its rear end, a long leverage is obtained by which the axle is very easily turned, and by compounding the lever power by means of the operating-lever O, and by giving a long sweep to the latter lever, a very small expenditure of power is required to lift the plows out of the ground.

In a full-sized plow the lever O at the rack will have a sweep of about five feet and a half, while the point at which the power is applied to the rear end of the bar K moves but little over a foot, thus greatly reducing the power required to lift the plows. In some cases—as, for instance, when a boy is operating the plow—a weight, S, can be secured to the extremity of the lever O to counterbalance the weight of the plows and frame.

My chief object in this invention is to provide a simple and cheap mechanism for raising and lowering the plows with ease, and this the above-described combination of levers accomplishes.

Having thus described my invention, what I claim, and desire to secure by Letters Patent, is—

1. The cranked axle B with its rigid arms $j$ $j$, in combination with the lever-bar K with its arm $l$ and the operating-lever O, the two levers being so combined as to provide a compound lever for raising and lowering the plows and frame, substantially as above described.

2. The seat E supported by the loosely-connected standards $f$, and supported by the adjustable brace or link $g$, substantially as and for the purpose above described.

3. In combination with the above-described compound lever, I claim the weight S, substantially as and for the purpose above described.

In witness whereof I hereunto set my hand and seal.

CHARLES KEWIN. [L. S.]

Witnesses:
 WM. A. MOWRY,
 C. M. RICHARDSON.